(12) United States Patent
Gilson et al.

(10) Patent No.: US 11,815,345 B2
(45) Date of Patent: Nov. 14, 2023

(54) DEVICE FOR ORIENTATION AND POSITION DETECTION OF MARKINGS IN THREE-DIMENSIONAL SPACE

(71) Applicant: soft2tec GmbH, Ruesselsheim (DE)

(72) Inventors: Laurent Gilson, Hofheim am Taunus (DE); Wolfgang Bruening, Nidderau (DE); Frank Honisch, Ruesselsheim (DE)

(73) Assignee: SOFT2TEC GMBH, Ruesselsheim (DE)

( * ) Notice: Subject to any disclaimer, the term of this patent is extended or adjusted under 35 U.S.C. 154(b) by 0 days.

(21) Appl. No.: 18/010,820

(22) PCT Filed: Jan. 19, 2021

(86) PCT No.: PCT/EP2021/051087
§ 371 (c)(1),
(2) Date: Dec. 16, 2022

(87) PCT Pub. No.: WO2021/259523
PCT Pub. Date: Dec. 30, 2021

(65) Prior Publication Data
US 2023/0196610 A1    Jun. 22, 2023

(30) Foreign Application Priority Data
Jun. 25, 2020   (DE) ..................... 20 2020 103 679.3

(51) Int. Cl.
*G06T 7/73*    (2017.01)
*G06V 10/24*    (2022.01)
*G01B 11/00*    (2006.01)

(52) U.S. Cl.
CPC ............. *G01B 11/002* (2013.01); *G06T 7/73* (2017.01); *G06T 2207/30204* (2013.01); *G06V 10/245* (2022.01)

(58) Field of Classification Search
CPC .... G06T 7/10; G06T 7/12; G06T 7/13; G06T 7/70; G06T 7/73; G06T 7/74; G06T 7/75;
(Continued)

(56) References Cited

U.S. PATENT DOCUMENTS 5,227,985 A   7/1993  DeMenthon
6,166,809 A   12/2000 Pettersen et al.
(Continued)

FOREIGN PATENT DOCUMENTS

DE    102015013551 A1   4/2017
DE    102014012693 B4   11/2019
(Continued)

*Primary Examiner* — Andrew W Johns
(74) *Attorney, Agent, or Firm* — LEYDIG, VOIT & MAYER, LTD.

(57) ABSTRACT

A device for orientation and position detection of markings in three-dimensional space includes a marking unit, an optical image capture unit adapted to capture images thereof and an evaluation unit adapted to unambiguously determine the orientation and the position of the marking unit. The marking unit has exactly three markings arranged on a first straight line and exactly two markings arranged on a second straight line. The straight lines intersect in one of the markings so that there is exactly one common marking. The marking unit has a communication element arranged on the second straight line. Several marking units are provided, which are operatable simultaneously and which are adapted such that the marking units are distinguishable on the basis of the various communication elements. The evaluation unit is adapted to recognize all markings and/or communication elements in a captured image and to assign 2-dimensional image coordinates to them.

17 Claims, 8 Drawing Sheets

(58) Field of Classification Search
CPC ........ G06T 2207/30204; G06V 10/245; G01C 11/04; G01C 15/002; G01C 15/004; G01B 11/002; G01B 11/005; G01B 11/03; G01B 21/04; G01B 21/047
See application file for complete search history.

(56) References Cited

U.S. PATENT DOCUMENTS

| | | |
|---|---|---|
| 7,742,895 B2 | 6/2010 | Seko et al. |
| 2005/0201613 A1 | 9/2005 | Mostafavi |
| 2008/0111985 A1 | 5/2008 | Bridges |
| 2010/0014750 A1 | 1/2010 | Seko et al. |
| 2012/0262487 A1 | 10/2012 | Huebner |
| 2022/0175464 A1* | 6/2022 | Moctezuma de la Barrera et al. ............... A61B 34/20 |

FOREIGN PATENT DOCUMENTS

| | | |
|---|---|---|
| DE | 102019114531 A1 | 12/2020 |
| EP | 1 498 688 B1 | 9/2005 |
| EP | 1 813 911 A1 | 8/2007 |
| WO | WO 2004/114112 A1 | 12/2004 |
| WO | WO 2006/069748 A1 | 7/2006 |

\* cited by examiner

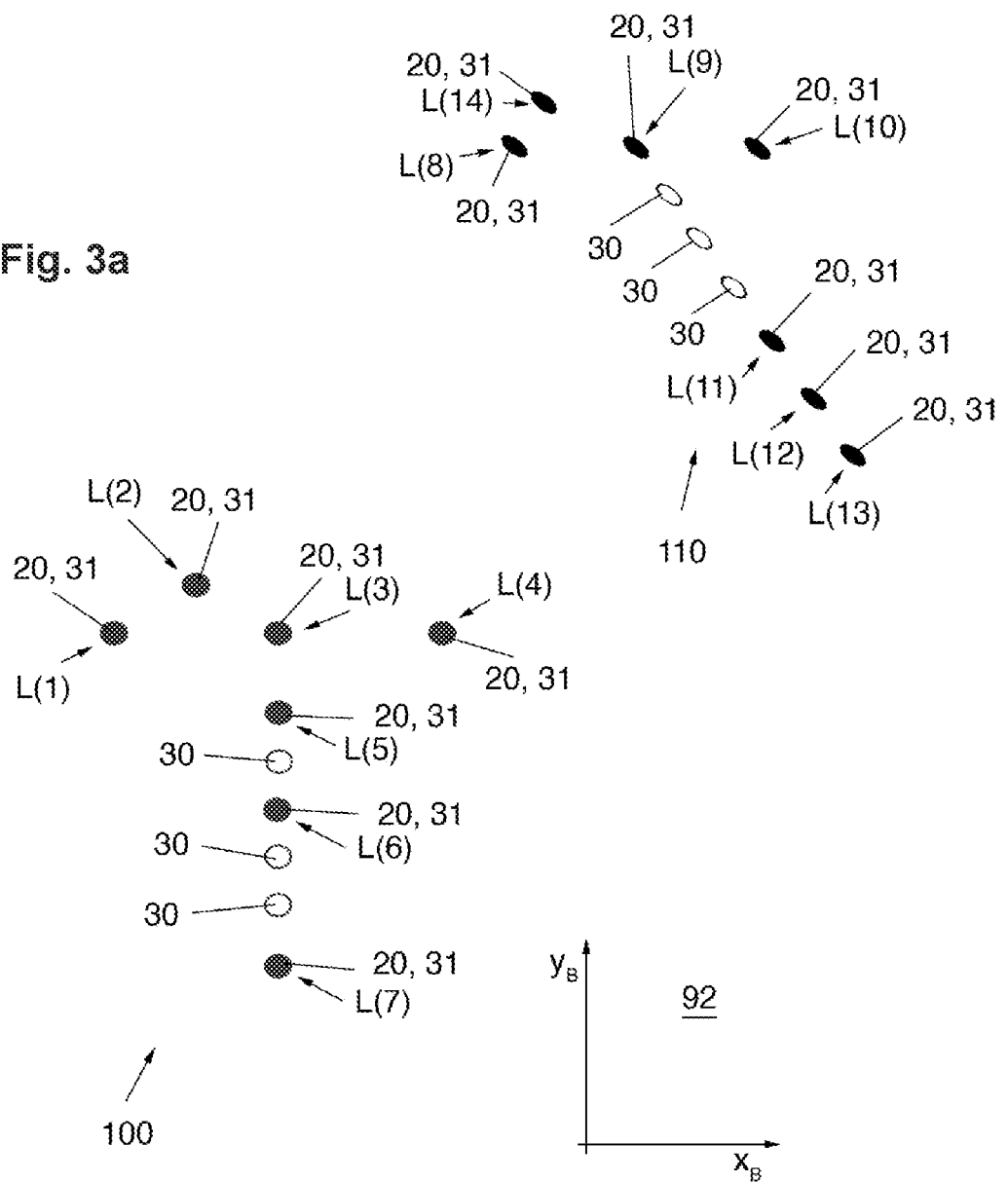

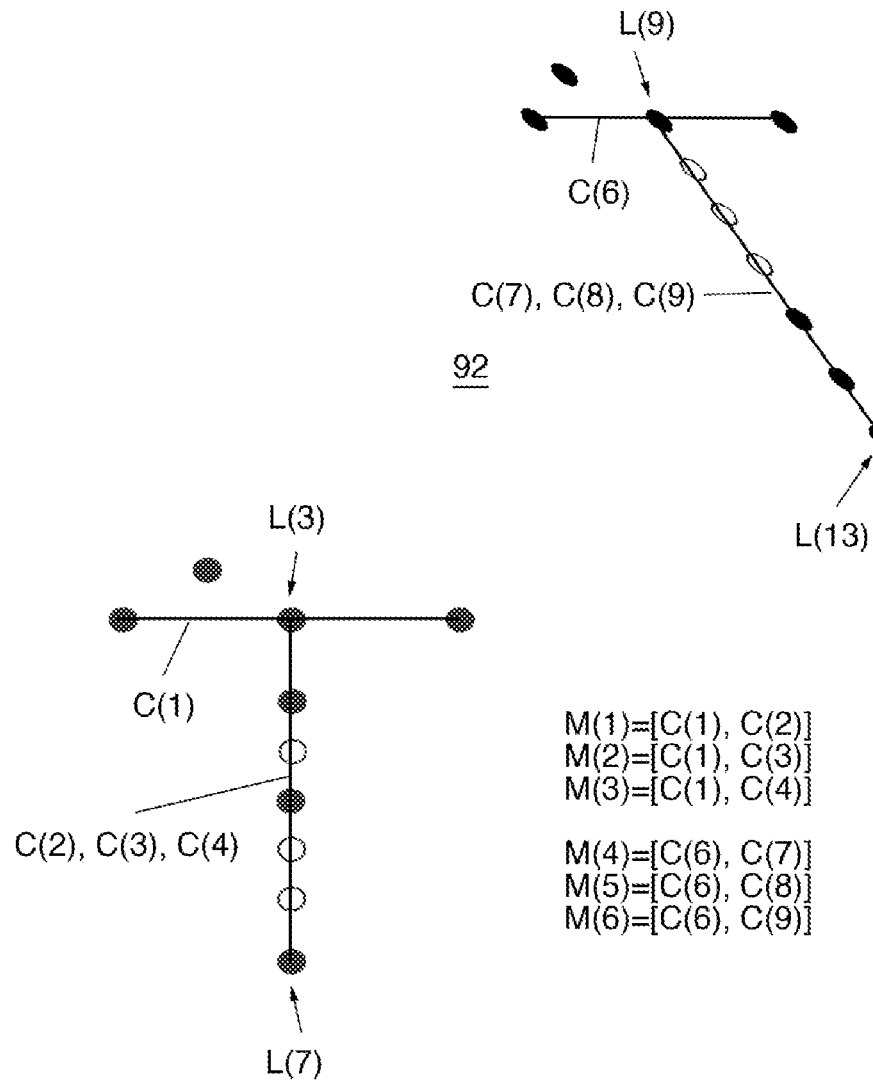

DEVICE FOR ORIENTATION AND POSITION DETECTION OF MARKINGS IN THREE-DIMENSIONAL SPACE

CROSS REFERENCE TO RELATED APPLICATIONS

This application is a U.S. National Phase application under 35 U.S.C. § 371 of International Application No. PCT/EP2021/051087, filed on Jan. 19, 2021, and claims benefit to German Patent Application No. DE 20 2020 103 679.3, filed on Jun. 25, 2020. The International Application was published in German on Dec. 30, 2021 as WO 2021/259523 A1 under PCT Article 21(2).

FIELD

The present invention relates to a device for orientation and position detection of markings in three-dimensional space, in particular with:
  at least one marking unit, being in particular fixable to an object, with several markings,
  an optical image capture unit adapted to capture images of the marking unit, and
  with an evaluation unit that is adapted to unambiguously determine the orientation and the position of the marking unit, wherein the marking unit has at least five markings for determining orientation and position.

The proposed marking unit has at least five markings (in the sense of optically active markings) for determining orientation and position, of which preferably at least four of the markings lie in a common plane and preferably at least one of the markings lies outside this plane. However, designs are conceivable in which all five optical markings lie in a common plane.

BACKGROUND

Systems and methods are known from the publications US 2010/014750 A1, US 2012/262487 A1, EP 1 813 911 A1, US 2005/0201613 A1, EP 1 498 688 B1, WO 2004/114 112 A1, US 2008/0111985 A1, WO 2006/069 748 A1, U.S. Pat. Nos. 5,227,985 A, 7,742,895 B2 and DE 10 2014 012 693 B4 which can determine the orientation and position of an object in space by means of capturing a marking unit fixed to the object. For this purpose, optically active, i.e. self-luminous, or optically passive, i.e. light-reflecting, markings are provided on the marking unit in a fixed geometric arrangement. Many different arrangements for evaluation are possible. Most of the proposed arrangement provide for at least four markings, of which at least three markings span a plane and at least one marking lies outside this plane. The at least three markings arranged in a plane may lie on at least two non-parallel straight lines spanning the plane. Such an arrangement of the markings enables reliable determination of the orientation and position of the marking unit in space from a single captured two-dimensional image of the marking unit, which is captured by means of an optical image acquisition unit (e.g. a camera, in particular a digital camera).

DE 10 2014 012 693 B4 describes a reliably operating but complex system and method. The position and orientation determination is based on a single two-dimensional image of a marking arrangement provided with at least seven markings, which is attached to the object. The system further comprises an image capture unit for capturing a two-dimensional image of the object or the marking arrangement arranged on the object, and an evaluation unit for unambiguously determining the orientation and position of the object based on the captured image. The seven markings of the marking arrangement are in a fixed spatial relationship to one another, six of these markings forming a plane, while the seventh marking is arranged outside or at a distance from that plane. The six markings are divided into groups that lie on two different straight lines that intersect at an angle of 90°. The first straight line includes at least four markings, and the second straight line includes at least two other markings. In a top view of the plane, the seventh out-of-plane marking also lies on this first straight line, on a side of the second straight line that faces away from at least two markings of the first straight line. This is important for an unambiguous assignment of the image markers, i.e. the markings depicted in the image, and thus the reconstruction of the position and orientation of the markings in space. During the evaluation, several homographies are calculated for possible assignments. From these homographies an orientation determination is reconstructed in each case. Based on this, the average reprojection error (compared to the known actual arrangement of the markings on the marking arrangement) is calculated for all image markings for each orientation determination. The homography with the lowest error is the correct one and is used for the unique orientation determination.

This evaluation leads to good results in practice, but is very extensive in terms of image evaluation and computational power of the system, especially due to the need to compute more than one homography and to estimate a position by applying a Levenberg-Marquardt solver each time. Furthermore, reproduction errors are computed for the coplanar markings and the non-coplanar markings, and the matching minima are used for the orientation evaluation. This complex calculation, and especially the consideration of the high number of markings, leads to problems in live tracking of fast moving objects, because the computational power of systems used in practice is not sufficient, especially if not only one marking arrangement is monitored in a system, but a plurality of marking arrangements, possibly even in one image.

Theoretically, each marking arrangement can be distinguished from other marking arrangements captured in the image by different markings. However, the evaluation of the environment of the marking arrangement in the image regularly leads to ambiguities when tracking moving objects if these markings (e.g. in the form of stickers) are not exactly recognizable optically in the image. In principle, it would also be conceivable to arrange the markings on the marking arrays in geometrically different ways. However, this leads to the already complex evaluation of many markings.

SUMMARY

In an embodiment, the present disclosure provides a device for orientation and position detection of markings in three-dimensional space. The device comprises at least one marking unit with several markings, an optical image capture unit adapted to capture images of the marking unit and an evaluation unit adapted to unambiguously determine the orientation and the position of the marking unit. The marking unit has at least five markings for determining orientation and position. Exactly three markings are arranged on a first straight line and exactly two markings are arranged on a second straight line, wherein the first and second straight lines intersect in one of the markings so that exactly one common marking belongs to both the first and the second straight line. The marking unit has at least one communication element for coding the marking unit. The image capture unit is adapted to capture an image of the marking unit with the markings and the at least one communication element, wherein the markings and the at least one communication element are each optically active means. The evaluation unit is adapted to determine the orientation and position of the marking unit in the captured image from the markings and to determine an identity of the marking unit from the at least one communication element. The at least one communication element is arranged on the second straight line between the markings. None of the communication elements are taken into account for the determination of orientation and position. Several marking units are provided, which are operatable simultaneously in the device and which are adapted such that the marking units are distinguishable on the basis of the various communication elements. The evaluation unit is adapted to recognize all markings and/or communication elements in the captured image and to assign 2-dimensional image coordinates to the markings and/or communication elements in the captured image.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIGS. 3a to 3e each show an exemplary image of the image capture unit of the device according to FIG. 1 with detected markings and communication elements of two different coded marking units at different evaluation steps.

DETAILED DESCRIPTION

Figure 1:
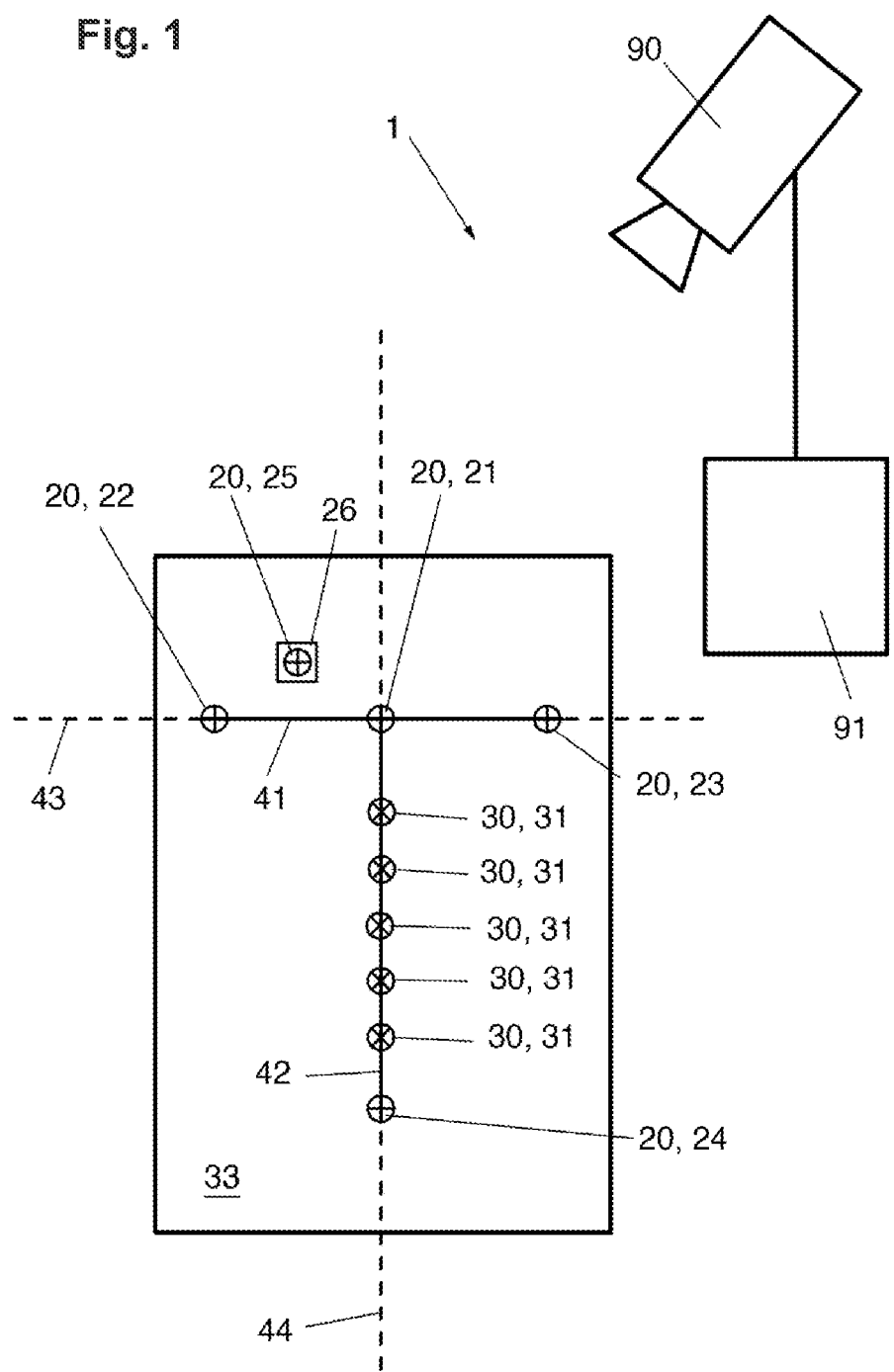
FIG. 1 is a schematic representation of a device for detecting the orientation and position of markings according to one embodiment of the invention.

In the industrial environment, it is desirable to sometimes be able to determine the orientation and position of marking units very quickly in order to be able to use real-time applications—especially in production lines. For this purpose, the evaluation of the camera images and the determination of orientation and position must be fast enough to allow use directly in the production process, e.g. for motion control. It is also desirable to limit the energy requirements of such marking systems, some of which are battery-powered, in favor of long operating times.

Embodiments of the invention provide a simplified possibility for the orientation and position detection of marking units in a system for orientation and detection of the type mentioned above, which enables the detection of different marking units in one image, whereby the marking units themselves are to be operable in the most energy-saving manner possible.

According to an embodiment of the invention, the simplified possibility for the orientation and position detection of marking units in a system for orientation and detection of the type mentioned above, which enables the detection of different marking units in one image, whereby the marking units themselves are to be operable in the most energy-saving manner possible, is provided for by a device comprising a marking unit that has at least one communication element for coding the marking unit, which is not a marking. According to an embodiment of the invention, the communication elements are not taken into account for the determination of orientation and position. This significantly reduces the number of markings used for orientation and position detection. This leads to an acceleration of the orientation and position detection.

According to an embodiment of the invention, the image capture unit is adapted to capture an image of the marking unit with the markings and the at least one communication element, wherein the marking units installed and used in a system are set up according to an embodiment of the invention such that selected (optically active) communication elements from a plurality of (optically basically activatable) communication element devices are actually optically active. According to a particularly preferred embodiment, the selected communication elements, i.e. the optically activated or switched-on communication element devices, cannot be changed during operation. This prevents the marking units with distinguishable communication elements known in the evaluation unit from being changed.

The evaluation unit is further configured to determine the orientation and position of the marking unit from the markings in the captured image and to determine an identity of the marking unit from the at least one communication element.

In a device with several marking units which can be or are operated simultaneously in the device (in the sense of a system with more than one marking unit) (i.e. apart from, for example, replacement marking units), it is particularly preferred according to an embodiment of the invention that all marking units can be distinguished by means of differently arranged communication elements. For this purpose, it can be provided according to an embodiment of the invention that the marking unit has a plurality of (basically activatable) communication element means which are arranged at distinguishable positions of the marking unit. Marking units that can be operated or are operated in a device (i.e., installed in the device) are then set up according to an embodiment of the invention in such a way that they can be distinguished on the basis of the various communication elements (i.e., the optically active communication element devices). Preferred embodiments of the invention provide for seven or eight communication element means arranged at distinguishable positions of the marking unit, of which one, two or three are activated as communication elements in the case of a marking unit installed in the device. However, the number of communication element means provided can be varied in principle.

In a further preferred embodiment according to the invention, exactly five markings are provided in a marking unit. Practical experience has shown that the orientation and position of marking units with exactly five markings can be determined well and quickly, even in an industrial environment. A larger number of markings noticeably slows down the detection speed of the algorithms and also leads to increased energy demand.

According to a further preferred embodiment of the invention, the evaluation speed can further be accelerated by arranging the markings of all marking units at the same position of the marking units in devices with more than one marking unit. In this way, the algorithms can be accelerated because an arrangement that is always the same can be used for the detection and the logic of the algorithm is optimized for precisely this arrangement.

According to an embodiment of the invention, the positions of the markings on the marking unit are known to the evaluation unit, regardless of how many markings are provided or whether the markings are arranged in the same positions on all (different) marking units of the system.

Markings and communication elements are each understood to be optically active means that can be picked up by the image capture unit and are visible in the image. The marking means and the communication element means are preferably activatable, i.e. switchable on and off, illuminating means, such as optical light-emitting diodes or, particularly preferably, IR light-emitting diodes. The image capture unit, preferably a camera, is arranged to capture these optically activated illuminating means, i.e. the markings and the communication elements. Illuminating means that are not switched on do not serve as markings or communication elements. These are usually not or not reliably recognizable in the images; accordingly, the image capture unit and the evaluation unit are not adapted to capture switched-off (non-activated) marking means and communication element means or to recognize them in the images. Accordingly, more marking means and/or communication element means may be provided on the marking units, which in principle would be activatable. However, the marking units are adapted to activate, i.e. switch on, only certain selected marking means, so that in an installed system there is a fixed arrangement of markings which cannot be changed. Deactivated marking means and communication element means have no function and are not present in the meaning of the invention.

Thus, in the meaning of the invention, the selected markings constitute the markings that cannot be changed and are used for orientation and position determination. They cannot be turned on (activated) in an installed system, so they are not markings in the sense of the invention and are not and cannot be used in orientation and position determination. This is important because the evaluation unit is optimized for a special arrangement of the markings in order to be able to perform orientation and position detection quickly and reliably, so that real-time applications are also feasible. The marking units are set up with others such that they all have the same markings in the same arrangement and cannot be changed in the installed system.

Communication elements that can be used or are used for the identification of the marking unit can also not be changed during operation. However, they are preferably unique for each of the multiple marking units used in the same system (device) and adjustable when new marking units are integrated into the device. However, the combination of communication elements is adjustably different in each marking unit of the system and forms a kind of coding by which the marking unit is uniquely identifiable in the system. The combinations of communication elements (codes) set up in a system are known in the evaluation unit according to an embodiment of the invention.

According to a preferred embodiment of the invention, exactly three of the at least or exactly five markings are arranged on a first straight line and exactly two of the at least or exactly five markings are arranged on a second straight line, wherein the first and second straight lines intersect in one marking, so that exactly one common marking belongs to both the first and the second straight line. According to an embodiment of the invention, no further markings are found on the first and second straight lines. In other words, exactly four markings are provided on the first and second straight lines, which lie in a common plane spanned by the two straight lines, with exactly three markings being located on the first straight line and exactly two markings being located on the second straight line. Preferably, the first and second straight lines intersect at exactly a right angle.

A particularly preferred embodiment of this pre-described arrangement provides that a first straight path connecting the markings on the first straight line and a second straight path connecting the markings on the second straight line form a T-shape, the first path being shorter than the second path. Particularly preferably, the first path and the second path form a true T-shape in that the first path and the second path are perpendicular to each other. In a preferred embodiment, the second path meets the first path exactly in the middle. In other words, in this embodiment, the first path forms the horizontal leg of the T and the second path forms the vertical leg of the T, and the common marking is at the center of the first path and at one end of the second path.

The edge markings of the first straight path that lie on the first straight line are called the first and second outer markings. Between the first outer marking and the second outer marker, the middle marking of the first straight path, which also forms the common marker, optionally lies exactly in the middle. Accordingly, the common marking lies at the intersection of the first and second straight lines.

The edge markings of the second straight path that lie on the second straight line are called the first and second end markings. The common marking is the first end marking, the marking lying at the opposite end of the second straight path is the second end marking.

The first and second paths, which are connected to each other, connect all markings as well as any communication elements on the first and second straight lines. Accordingly, the markings lie on the respective path as well as on the respective straight lines. Differently than the infinite long straight lines in the mathematical understanding, however, the respective paths end in the edge markings. If this property is not important, the terms "first and second path" and "first and second straight line" are also used synonymously; the paths are sections of the straight lines in each case.

In continuation of this above-described inventive idea, at least one distinguished marking of the at least or exactly five markings does not lie directly on one of the first or second straight lines, nor is this distinguished marking arranged outside a plane spanned by the first and second straight lines in such a way that a perpendicular projection of the distinguished marking into the plane lies on one of these straight lines. By a perpendicular projection onto the plane is meant a projection in the direction of the surface normal, that is, of a straight line perpendicular to the plane. By such a marking, which is not assigned to one of the straight lines, the accuracy in the determination of orientation and position can be improved with simple algorithmic detection of this distinguished marking.

A particularly good determination of orientation and position can be achieved if the at least one distinguished marking is arranged above the plane spanned by the first and second straight line.

In a preferred embodiment of the invention with exactly five markings on the marking unit, there is correspondingly exactly one distinguished marking.

The arrangement of the distinguished marking according to an embodiment of the invention may preferably be asymmetrical with respect to the second straight line. According to a specific embodiment of the invention, it is proposed as a preferred variant that the distinguished marking or the projection of the distinguished marking into the plane is arranged at a first distance from the middle marking of the first straight line (i.e. the common marking coinciding with the middle marking of the first straight line) and at a second distance from a first one of the outer markings of the first straight line, the first distance and the second distance each being smaller than the distance between the first outer marking and the middle marking along the first straight line.

The perpendicular projection of the distinguished marking into the plane coincides with the marking in the sense of the invention if the marking itself is located in said plane. As a result, the marking or the projection of the marking into the plane—with respect to the second straight line—always lies on the side of the first outer marking. In other words, the distinguished marking is always located in the half of the plane divided by the second straight line, in which the first outer marking is also located. This creates an asymmetry with respect to the second straight line.

This asymmetry in the marking unit can be exploited to advantage when determining the orientation and position of the distinguished marking in order to detect possible marking units in the captured image quickly and with a high detection rate, thus helping to determine the correct orientation and position of the marking unit particularly quickly and reliably. This will be explained in more detail later.

The first distance and the second distance can preferably be the same. This means that the first and the second distance are smaller than the distance between the first outer marking and the middle marking and larger than half the distance between the first outer marking and the middle marking. In practice, the first and second distances will be chosen to be at least large enough so that the entire area of the distinguished marking lies outside an area around the first straight line that corresponds to the total area of the marking (LED). This ensures that the distinguished marking does not overlap with a marking lying on the first straight line (or its perpendicular projection). This avoids detection problems of the distinguished marking in the captured image. The same (and thus as large as possible) distance between the first and the middle marking on the first line also contributes to this. In particular, if the distinguished marking is arranged above the plane spanned by the first and second straight line, individual markings may otherwise be hided more quickly—depending on the angle of view during the exposure.

In an embodiment of the invention, it is provided that the communication elements which, according to the invention, are not used for determining the orientation and position of the marking unit in the algorithm are arranged on the second straight line between the markings. Preferably, all communication elements of the marking unit are arranged between the exactly two markings of the second straight line. In this way, the communication elements can be easily recognized and enable a particularly simple identification of the marking unit, if necessary even without performing orientation and position determination solely on the basis of an evaluation of the captured image, without determining the orientation and position of the marking unit. This is particularly advantageous when several marking units are captured in one image, but the position and orientation of only one particular marking unit is of interest. By applying criteria concerning the identification of marking units, possible marking units detected in the images but not of interest can then be excluded before orientation and position detection is performed for these marking units.

In particularly preferred embodiments of the invention, a range between five to ten, preferably seven or eight, communication element devices can be provided between the two markings of the second straight line, wherein the marking unit is preferably adapted to activate one, two or three as communication elements from the total communication element means provided. In other words, one to three active communication elements are provided.

Depending on the number of activated communication element means (i.e., communication elements), different numbers of marking units can thus be distinguished. For example, with eight communication element means in the marking unit and one activated communication element (i.e., one communication element), eight different marking units can thus be identified, and with eight communication element means in the marking unit and two activated communication elements, twenty-eight different marking units can be identified. This makes it possible to distinguish between a corresponding number of different marking units in a system, which are assigned to different objects, for example.

According to an embodiment of the invention, the evaluation unit is also adapted to carry out a method by means of which the captured images are evaluated and the orientation and position of the markings (and thus also of the one or possibly more marking units belonging to the markings captured in the images) and the identity of the marking unit(s) are determined.

This method is expressly also subject of an embodiment of the invention described herein and can be carried out according to an embodiment of the invention by an evaluation unit, in the sense of a computing unit which is set up or designed to carry out this method or individual method steps. Another embodiment of the invention also relates to a computer program product with which the steps of the method according to the invention are carried out, if a processor of the computing unit (or of the evaluation unit, respectively) is designed to execute the program code of the computer program product.

Aspects of this process according to embodiments of the invention are described below. These may be combined individually or in any combination useful in the art to form a specific process; all processes so combined are subject matter of embodiments of the invention.

According to an embodiment of the method proposed in accordance with the invention, markings and/or communication elements are detected in the captured image by means of conventional methods for image evaluation and 2-dimensional image coordinates can be assigned to them. The 2-dimensional image coordinates ($x_B$, $y_B$) indicate the position of a marking or a communication element in the image of the marking unit captured by the image capture unit and are the basis for the evaluation of the image described below for identifying the marking unit and for recognizing or determining its orientation and position relative to the image capture unit. Usually, an image capture unit (camera) is calibrated three-dimensionally in space in a known manner, so that along with the orientation and position relative to the image capture unit, the orientation and position in space are also known. These methods for calibrating cameras are sufficiently known to the skilled person from the prior art.

In order to detect markings and/or communication elements in the captured image, it can be provided in accordance with an advantageous embodiment of the invention that all straight paths with a total of exactly three markings and/or communication elements are determined in the captured image. This means that all exactly three illuminating means (markings and/or communication elements) being switched on and thus reliably detectable in the image which are arranged in a straight path are detected in a totality of straight paths with three switched-on illuminating means, regardless of whether the illuminating means are markings or communication elements. These paths are recorded and can be kept, for example, as a 3-tuple with the image coordinates of each of the exactly three markings/communication elements in, for example, a list. A 3-tuple thus describes a straight path with three markers/communication elements that can be recognized in the captured image. All 3-tuples determined in this way then form the totality of straight paths. For example, a 3-tuple has the form $[x_B(1), y_B(1); x_B(2), y_B(2); x_B(3), y_B(3)]$, where the numbers in parentheses are the numbering of the recognized illuminating means (markings/communication elements).

If there are more than three markings or communication elements arranged on a straight path in the captured image, each possible sub-combination with exactly three markings or communication elements is considered to be one of the determined straight paths with exactly three markings/communication elements and is recorded in the totality of the straight paths, e.g. included in the list of 3-tuples.

In the following, straight paths are sometimes referred to simply as paths for the sake of simplicity. These terms are therefore used synonymously.

In order to generate a first selection criterion for such paths from the totality of straight paths which can in principle be considered as first and second paths of a marking unit, it can be proposed according to one embodiment of the invention to determine from all determined straight paths, i.e. the totality of straight paths, with exactly three markings and/or communication elements, such paths which have exactly one common marking. The straight paths thus determined can then be assigned to a possible marking unit if it is determined that, for exactly one straight path the common marking is located in the middle of the straight path and for at least one (or more) other straight path(s) the common marking is located at one end of the straight path, i.e. represents an edge marking which can be identified with the first end marking of the second path.

This can be achieved, for example, by the following procedure: From the set of straight paths with a common marking/communication unit, those paths are selected where the common marking/communication unit is located in the middle. Each of these paths with the middle common mark/communication unit is considered as a subgroup in combination with all paths of the set where the common mark/communication unit is located at the end. Subgroups consisting of two or more than two paths (one with middle common mark/communication unit and at least one other with common mark/communication unit at the end) are considered as a possible marking unit. If such a subgroup turns out to be a marking unit in the further course, the common marking of the subgroup is actually a marking and not a communication element.

If the common marking is in the middle of the straight path, the straight path can be assigned to the first straight line. If the marking is at the end of the straight path, the straight path can be assigned to the second straight line. It is conceivable to discard all straight paths that cannot be assigned to a possible marking unit, for example by deleting them from the list of all straight paths. The shorter this list is, the faster the evaluation of the captured image and the orientation and position detection that still has to be carried out afterwards.

Accordingly, the other straight paths that have been or could be assigned to a possible marking unit can be included in a list of possible marking units, where in each case all straight paths assigned to a possible marking unit are preferably combined in a selected group.

A further (second) selection criterion, which can be applied in particular together with the first selection criterion, but possibly also separately from it, can provide that, in particular, among the straight paths assigned to a possible marking unit, a subgroup of straight paths is determined which have matching end markings at their two ends. These are in fact markings and not communication elements. A first end marking is the common marking, a second end marking is the marking located at the opposite end of the second straight line of the marking unit, with all communication elements located between the first end marking and the second end marking. There is then exactly one communication element per path between the common end markings. In an embodiment of the invention in which only one communication element is provided, the subgroup of straight paths includes only one path, in the case of two communication elements two paths, and so on, wherein the communication elements are positioned at different positions between the end markings because the marking unit is arranged such that different ones of the communication element devices are switched on or activated.

These pre-described selections are useful to make a reasonable preselection of possible marking units from all determined straight lines with a total of exactly three markings and/or communication elements, which are further considered in the following described steps during orientation and position detection. Because this step is computationally more intensive than the preselection described above, it is useful to make such a preselection. However, it may also be useful to carry out this selection as the first or detached from other selection criteria, because this selects those straight paths which have common markings between which the communication elements are arranged. According to an embodiment of the invention, it may be provided to group from the totality of such paths an arrangement of communication elements together with the length of the second path, i.e. the distance between the first and second end markings of the second path, for example in the form of an n-tuple normalized to the length of the second path, and to derive from such an encoding of the communication elements an identification of the marking unit by comparison with encodings of communication elements permitted in the system (device) as a whole. This can be done before orientation and position detection is performed. Thus, after identification of the marking units, those can be discarded and, for example, deleted from the list of possible marking units (also referred to as a selected group) that are not of interest in the orientation and position detection just performed. This also increases the evaluation speed enormously.

In order to identify the individual markings in the captured image, it can be provided according to an embodiment of the invention to assume in each case the edge markings of two of the determined straight paths as provisional markings of a marking unit. If the selection described above has taken place completely or partially, the number of assumed marking units for which this selection step must be performed can be significantly further reduced, for example to combinations of straight paths with a common marking ("possible marking unit"). For the second straight line, the two end markings can additionally be preselected, and as an additionally applied criterion, it can be additionally checked that one of the end markings matches the common marking.

For the first straight line, it can be applied as an additional criterion that the common marking is located between the outer markings. By a combination of all these selection steps further paths can be excluded if applicable.

In practice, it will usually be the case that only one possible marking unit remains after one or more selection steps. In this case, the further selection with differently defined selection steps can be cancelled according to an embodiment of the invention, and an assignment of the individual markings can be continued. This can be understood as a preliminary step or first step for performing the orientation and position detection, in order to optionally accelerate the orientation and position recognition.

After such a preselection, in which one or possibly several marking units remain, it can be useful according to an embodiment of the invention to assign the edge markings of the straight path, in which the common marking lies in the middle of the straight path, to the first straight line as first outer marking and second outer marking, and to assign the edge markings of the straight path, in which the common marking lies at the end of the straight path, to the second straight line, whereby the common marking can be selected as the first end marking and the other edge marking as the second end marking.

For notation in this text the following: the first outer marking (as one of the edge markings of the first straight path on the first straight line) lies on the left side of the second straight line (respectively the common marking in the middle of the first straight path) in the plan view of the marking order and the second outer marking (as the other of the edge markings of the straight paths on the first straight line) lies on the right side of the second straight line (respectively the common marking in the middle of the first straight line) in the plan view of the marking order. The first end marking of the second straight path on the second straight line corresponds to the middle marking of the first straight path on the first straight line, and the second end marking of the second straight path lies on the right side of the first straight line in the plan view. This notation is arbitrary and corresponds to the embodiment example shown later. Technical functions are not connected with it.

If necessary, at least if after one or more of the previously performed selections there are still more than one possible marking unit to be considered in the captured image, an attempt can be made to perform a further selection based on the distinguished marking. This is described in the following.

As a further selection option, according to an embodiment of the invention, an image area can be defined in the captured image, depending on the arrangement of the distinguished marking on the marking unit, and it can be checked whether a further marking with 2-dimensional image coordinates is assigned in this image area in the captured image. This is particularly useful and can be carried out quickly if the markings of the first path (straight line) have already been identified. In principle, however, it would also be conceivable to select pairs of markings captured in the image as a selection criterion, to try out this selection option for each of these pairs. However, this is time consuming. For the case described below, it is therefore assumed that a preselection of possible marking units has already taken place.

If this further selection concerning the distinguished marking is not successful, this possible marking unit can be excluded. This may further reduce the number of marking units to be calculated more precisely.

If the distinguished marking is placed at a first distance from the common marking and at a second distance from the outer marking on the marking unit, the image area can be defined, for example, by placing a first circle with a radius larger than the first distance around the common marking and a second circle with a radius larger than the second distance around the first outer marking and forming the image area by the intersection of the first or second circle. The radius of each of the circles may be defined, for example, by a (common or different) radius factor RF, the radius factor RF being chosen to be greater than one and preferably less than three, more preferably less than two. According to a preferred embodiment, the radius factor may also depend on the height at which the distinguished marking is located above the plane spanned by the first and second straight lines. The greater this height, the larger the image area should be selected because the more the projection of the distinguished marking may shift relative to the projection of the first outer marking and the common marking, especially if the image is taken from a large angle relative to the surface normal. A precise determination of a suitable image area can be made by the skilled person, for example on the software side, depending on the geometric conditions.

If several possible marking units remain (in particular after carrying out the aforementioned, optionally jointly or partially performed selections), this may be due to the fact that several different marking units are depicted in the captured image, which were captured together by the image capture unit, or that individual markings were not correctly assigned during the selection of the possible marking units or no selection was performed at all.

According to an embodiment of the invention, orientation and position detection is then carried out for all markings (remaining after a selection with one or more selection criteria or actually all markings without selection) and the orientation and position of the marking unit is determined. According to the invention, it is preferable to carry out an orientation and position detection on the basis of the markings of a possible marking unit, which are carried out as preliminary markings, because this significantly increases the overall evaluation speed.

The known positions of the markings (in a real marking unit) are used as boundary conditions for determining the orientation and position. Suitable algorithms are known to the skilled person from the prior art. In principle, all known algorithms are suitable here. In order to calculate back markings in a two-dimensional picture taken with a calibrated camera (in the sense of an optical image capture unit of an embodiment of the invention) to the orientation and orientation of the marking unit in the space, belong solution procedures such as P3P (Perspective-3-Point), in particular well-known algebraic solution algorithms for the perspective 3-point problem (AP3P procedure) or iterative solution algorithms for the perspective 3-point problem (iterative P3P), which are well-known to the person skilled in the art relevant here and are described e.g. in the following publications AP3P: Tong Ke and Stergios Roumeliotis, An efficient algebraic solution to the perspective-three-point problem. In Computer Vision and Pattern Recognition (CVPR), 2017 IEEE Conference on. IEEE, 2017, P3P: Xiao-Shan Gao, Xiao-Rong Hou, Jianliang Tang, and Hang-Fei Cheng. Complete solution classification for the perspective-three-point problem. *Pattern Analysis and Machine Intelligence, IEEE Transactions on,* 25(8):930-943, 2003. These well-known algorithms, provided the previously defined and known constraints are met, find the orientation and position of an object in space from the correspondences of known relations between markings on the object and their two-dimensional image in the picture of a calibrated camera.

To make these algorithms more robust against outliers in the point reconstruction in the images (i.e., including possibly misrecognized or misassigned markings), numerical optimization techniques known per se can be used to improve orientation and position detection.

The application of such methods is known to the skilled person. They can be applied to embodiments of the present invention in the manner described and, if necessary, adapted within the framework of a skilled person's optimization.

According to a preferred variant of the method step for determining the orientation and position, a first preliminary orientation and position detection can be carried out with four of the at least five markings. On the basis of the preliminarily determined orientation and position of the marking unit, expected image coordinates for the fifth of the five markings are then determined in the captured image and compared with the actually assigned image coordinates of this marking. If the positions of the image coordinates determined from the image and the expected image coordinates match within predetermined threshold values, the orientation and position detection is terminated and the orientation and position of the markings or the marking unit are output.

According to an alternative preferred variant, orientation and position detection can also be performed immediately on the basis of all five markings, since there is a finite number, typically equal to or less than two, of different arrangements of the five markings in a system. If the evaluation assumes the wrong arrangement of the markers, the back calculation will result in large discrepancies between expected and determined pixels. In this case the evaluation is repeated with the other possible arrangement.

If necessary, an attempt can also be made to improve the orientation and position detection by means of numerical optimization. In this case, prior knowledge of orientation and position, for example due to external limitations of the system, could be used to obtain starting points for a general optimization; possibilities for this are described in the prior art and are known to the skilled person.

According to a further embodiment, when carrying out the proposed method, as already indicated, it may also be provided to determine the identity of the marking unit from the distance between the communication element and one of the two markings, normalized to the distance between the two markings on the first straight line. With a known or a provisionally known orientation and position of the markings (and thus of the marking unit) and known possible orientations of the potentially activatable communication element devices, the activated communication element and thus the identity of the marking unit can be concluded by comparing the determined normalized distance and the expected normalized distance between a particular marking and the communication element.

If several communication elements are activated, which result in suitably distinguishable overall encodings, a suitable encoding can be generated by determining and superimposing all distances between a particular marking and the communication elements, which, if necessary, can be recognized and unambiguously assigned to a marking unit on the basis of the pattern (or the encoding) alone, even without prior orientation and position detection.

Further advantages, features and application possibilities of embodiments of the invention also result from the following description of embodiment examples and the drawing. Thereby, all described and/or graphically depicted features belong together or in any technically reasonable combination to the subject matter of embodiments of the invention, also independently of their combination in described or depicted embodiment examples or in the claims.

The device 1 shown in FIG. 1 for orientation and position detection of markings 20, 21, 22, 23, 24, 25 in three-dimensional space. The markings 20, 21, 22, 23, 24, 25 are arranged on a marking unit 10, which can be fixed to an object. By determining the orientation and position of the markings 20, 21, 22, 23, 24, 25, the orientation and position of the marking unit 10 in space and, if applicable, of the object to which the marking unit 10 is fixed is thus determined. The object is not shown in the drawing. The device 1 shown in FIG. 1 comprises a second, identically constructed marking unit 11, which is not shown twice in FIG. 1 for the sake of clarity.

The markings 20, 21, 22, 23, 24, 25 are captured by an optical image capture unit 90, adapted to capture images 92 of the marking units 10, 11 with the markings 20, 21, 22, 23, 24, 25 as well as communication elements 30, 31 to be described below. The optical image capture unit 90 may be a camera for capturing photographs and possibly films, in particular a digital camera known to the person skilled in the art. The image capture unit 90 is connected to an evaluation unit 91, to which the images 92 captured by the image capture unit 90 are transmitted. The evaluation unit 91 is then adapted to unambiguously determine the orientation and position of the marking unit 10, specifically by evaluating the captured image 92 while recognizing the markings 20, 21, 22, 23, 24, 25. In this process, the orientation and position of the marking unit 10, 11 are determined from the markings 20, 21, 22, 23, 24, 25 in the captured image 92, and the identity of the marking unit 10, 11 is determined from the communication elements 30, 31.

The marking unit 10, 11 shown in FIG. 1 according to a particularly preferred embodiment has exactly five markings 20, namely the markings 21, 22, 23, 24, 25 for orientation and position determination and five communication elements 30, 31, which can be used for coding and serve to identify the marking units 10, 11. The markings 20, 21, 22, 23, 24, 25 as well as the communication elements 31 are respectively activated or switched on illuminating means, in particular LEDs or infrared LEDs. Depending on whether the activated illuminating means is a marking 20, 21, 22, 23, 24, 25 or a communication element 31, these illuminating means, that can be switched on and off, are also referred to as marking means or communication element means 30. In the switched-on (i.e. optically active) state, the marking means are the markings 20, 21, 22, 23, 24, 25 and the communication element means 30 are the communication elements 31.

In the preferred embodiment, the marking unit 10 has exactly five marking means which are switched on for each marking unit 10, 11 incorporated in the device 1 and in operation, thus forming (optically active) markings 20. In the following, the markings are generally referred to by the reference sign 20, unless a specific marking 21, 22, 23, 24, 25 is meant, as will be explained further below.

In the illustration according to FIG. 1, a total of five communication element means 30 are provided, all of which are also switched on as communication elements 31 in the illustration according to FIG. 1. This is not so much a regular operating state of the marking units 10, 11 as a test operation. Regular operating states result in particular from FIGS. 3a to 3e.

In the following, communication element means are designated 30 and communication elements, i.e. switched-on communication element means, are designated 31. Communication element means 30 that are not switched on are shown in the following figures as a circle without a cross. In the image capture unit 90, these switched-off communication element means 30 are not reliably captured, and in any case are not taken into account in evaluation unit 91, even if they should be optically visible. Insofar as the device 1 has several marking units 10, 11 (of identical construction, for example), different communication elements 31 are provided in operation for each of the marking units 10, 11, i.e. different switched-on communication element means 30.

The pictorial distinction between marking means and markings 20 is not necessary because, according to the preferred embodiment, exactly five marking means are provided which are also switched on during operation, i.e. form markings 20. Therefore, no special reference sign is selected for marking means that are switched off.

In the particular arrangement of the markings 20, exactly three markings 21, 22, 23 are arranged on a first straight line 43 and exactly two markings 21, 24 are arranged on a second straight line 44, the first and second straight lines 43, 44 intersecting in the common marking 21. The common marking 21 thus belongs to both the first and the second straight lines 43, 44. The markings 21, 22, 23 on the first straight line 43 are connected by a first (straight) path 41 and the markings 21, 24 on the second straight line 44 are connected by a second (straight) path 42, the two paths 41, 42 forming a T-shape. The first path 41 is shorter than the second path 42 and the second path 42 meets the first path 41 exactly in the middle in the embodiment shown here. However, this is not absolutely necessary according to other embodiments of the invention.

The marking 22 shown in the illustration to the left of the second straight line 44 is referred to below as the first outer marking 22 of the first path 41 for precise designation, and the marking 23 shown in the illustration to the right of the second straight line 44 is referred to below as the second outer marking 23 of the first path 41 for precise designation. In the center thereof lies the common marking 21, in the example shown at the same distance from that of the first and second outer markings 22, 23. The common marking 21 thus simultaneously forms the middle marking of the first path 41 and first end marking of the second path 42. Opposite thereto, the second path 42 is bounded by the second end marking 24.

Another marking 20, namely the distinguished marking 25, is disposed above the plane 33 spanned by the first and second straight lines 43, 44, such that a perpendicular projection of the distinguished marking 25 into the plane 33 does not lie on either of these straight lines 43, 44.

Figure 2:
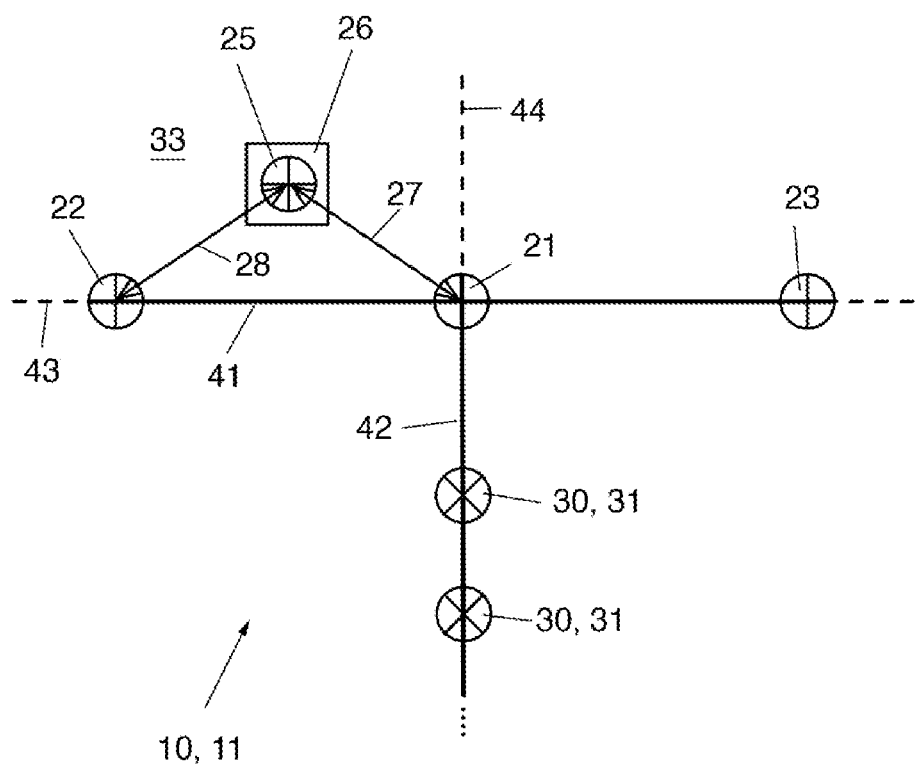
FIG. 2 is a detail enlargement of the marking unit shown in FIG. 1.

The exact arrangement of the distinguished marking 25 is explained with reference to FIG. 2, which shows an enlarged section of the markings 20 in the area around the common marking 21. The distinguished marking 25 located above the plane 33 is raised in relation to the other markings 21, 22, 23, 24 located in the plane 33 by a dome 26. In the plan view in the normal direction of the plane 33 shown in FIG. 2, the perpendicular projection of the distinguished marking 25 into the plane 33 lies exactly below the marking 25 and is not designated with an own reference sign.

The first distance 27 between the common marking 21 to the perpendicular projection of the distinguished marking 25 and the second distance 28 between the first outer marking 22 to the perpendicular projection of the distinguished marking 25 are equal in this example, the distance 27, 28 being greater than half of the distance between the markings 21, 22 and less than the distance between the markings 21, 22. In the embodiment, the distinguished marking 25 is located on the side of the first path 41 opposite the second path 42.

The communication element means 30, and correspondingly the communication elements 31 as switched-on communication element means 30, are all located on the second path 42 between the common marking 21 (also referred to as the first end marking of the second path 42 or the middle marking of the first path 41) and the second end marking. Preferably, the spacing between the communication element means 30 is equidistant. Thus, by switching-on different communication element means 30 for different marking units 10, 11, different patterns of communication elements 31 can be generated which allow, as a coding, to distinguish and respectively identify the different marking units 10, 11 in an image.

FIG. 3a shows an image 92 of the image capture unit 90 with images 100 and 110 of the two marking units 10 and 11, respectively, whereby the evaluation unit 91 cannot initially assign these marking units 10, 11. The evaluation unit 91 recognizes only markings 20 and/or communication elements 31 as light points shown darkly in FIG. 2, as well as eventually schematically communication element means 30 being switched off, which however are not considered and processed further. When communication element means 30, i.e. communication elements 31, are switched on, the reference sign 30 is not shown for the sake of clarity.

In a first evaluation step, all markings 20 and/or communication elements 31 are recognized as light points $L(1)$ to $L(n)$ in the captured image 92. The recognized light points $L(n)$ are numbered consecutively, whereby each light point (n) is assigned a 2-tuple with the image coordinates $L(n) = [x_B(n), y_B(n)]$. This result with the detected markings 20/communication elements 31 as light points $L(n)$ is drawn in FIG. 3a, where the light points are numbered as $L(1)$ to $L(14)$. In the following figures, the reference signs 20, 30, 31 are no longer shown for the sake of clarity.

Figure 3B:
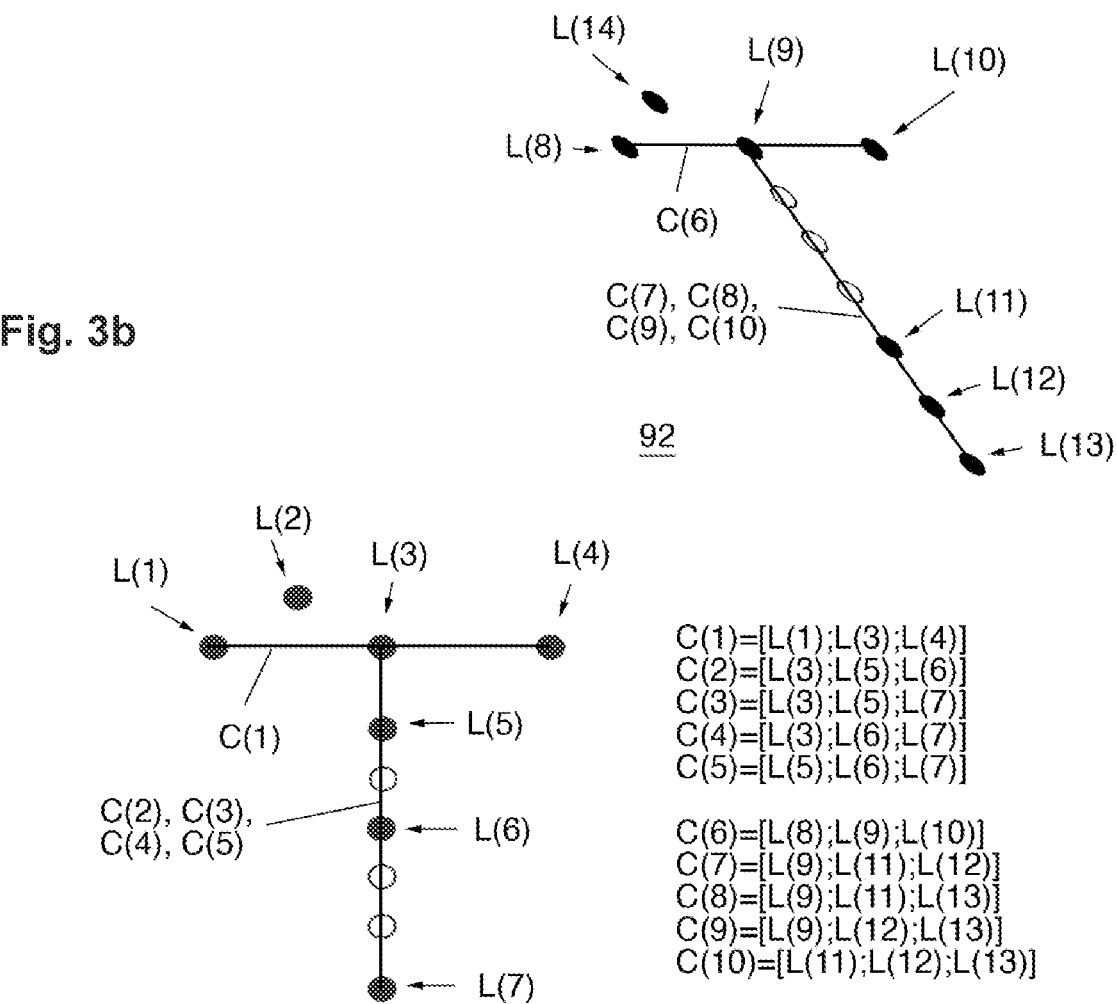

In a second evaluation step, all straight paths $C(m)$ with a total of three markings 20 and/or communication elements 31 are determined. These are shown in FIG. 3b. A total of ten such paths $C(1)$ to $C(10)$ can be identified. Each of these paths is included in a 3-tuple with the respective image coordinates of the light points $L(n)$, i.e. in a concrete example the path $C(1)$ contains the 3-tuples with the image coordinates of the light points $(L1)$, $L(3)$ and $L(4)$, i.e. $C(1) = [L(1); L(3); L(4)]$. All found paths $C(1)$ to $C(10)$ are listed in FIG. 3b as corresponding 3-tuples.

As the next evaluation step, those straight paths $C(n)$ are determined from all determined straight paths $C(n)$ with exactly three markings 20 and/or communication elements 31 which have exactly one common marking 20/communication element 31. In the example shown in FIG. 3c, these are once the paths $C(1)$, $C(2)$, $C(3)$ and $C(4)$, which each have the light spot $L(3)$ in common, and once the paths $C(6)$, $C(7)$, $C(8)$ and $C(9)$, which each have the light spot $L(9)$ in common.

Now those paths $C(n)$ are selected where the common light points $L(3)$ and $L(9)$ lie in the center. In the example these are the paths $C(1)$ and $C(6)$. For each of these paths $C(1)$ and $C(6)$, those paths are grouped where the common light points $L(3)$ and $L(9)$ respectively lie at the edge of the paths. This results in two subgroups in the example shown, namely subgroup 1 with paths $C(1)$, $C(2)$, $C(3)$, $C(4)$ and subgroup 2 with paths $C(6)$, $C(7)$, $C(8)$ and $C(9)$. These subgroups identify possible marking units $M(o)$.

In one of several possible variants, those pairs of these paths in subgroups can be assigned to a possible marking unit M(o), if it is determined, that for exactly one straight path C(1) respectively C(6) the common marking L(3) respectively L(9) lies in the middle of the straight path C(1) respectively C(6) and for at least one other straight path (C2), C(3), C(4) and C(7), C(8), C(9), respectively, the common marking L(3) and L(9), respectively, is located at one end of the straight path (C2), C(3), C(4) and C(7), C(8), C(9), respectively. As possible marking units M(o) in the sense of 2-tuples of paths c(n), for example, the path pairs M(1) to M(6) listed in FIG. 3c can be identified.

In a further evaluation step, for example, from the paths listed in the possible marking units M(o), i.e. the paths C(1), C(2), C(3), C(4), C(6), C(7), C(8), C(9), those paths C(n) can be determined as a subgroup which have matching end markings (in the sense of markings 20 or communication elements 31, i.e. light points L(n)). In the illustrated embodiment example, these are the paths C(3) and C(4) with the common end points L(3) and L(7) and the paths C(8) and C(9) with the common end points L(9) and L(13).

All possible marking units M(o) which do not contain one of these paths C(3), C(4), C(8) or C(9) can be excluded as possible marking units M(o). By this further selection only the possible marking units M(2), M(3), M(5), M(6) remain from the possible marking units M(1) to M(6) listed in FIG. 3c. The last step is omitted for marking units with only one communication element 31.

The selection steps described above can of course also be combined or carried out in reverse order.

Figure 3D:
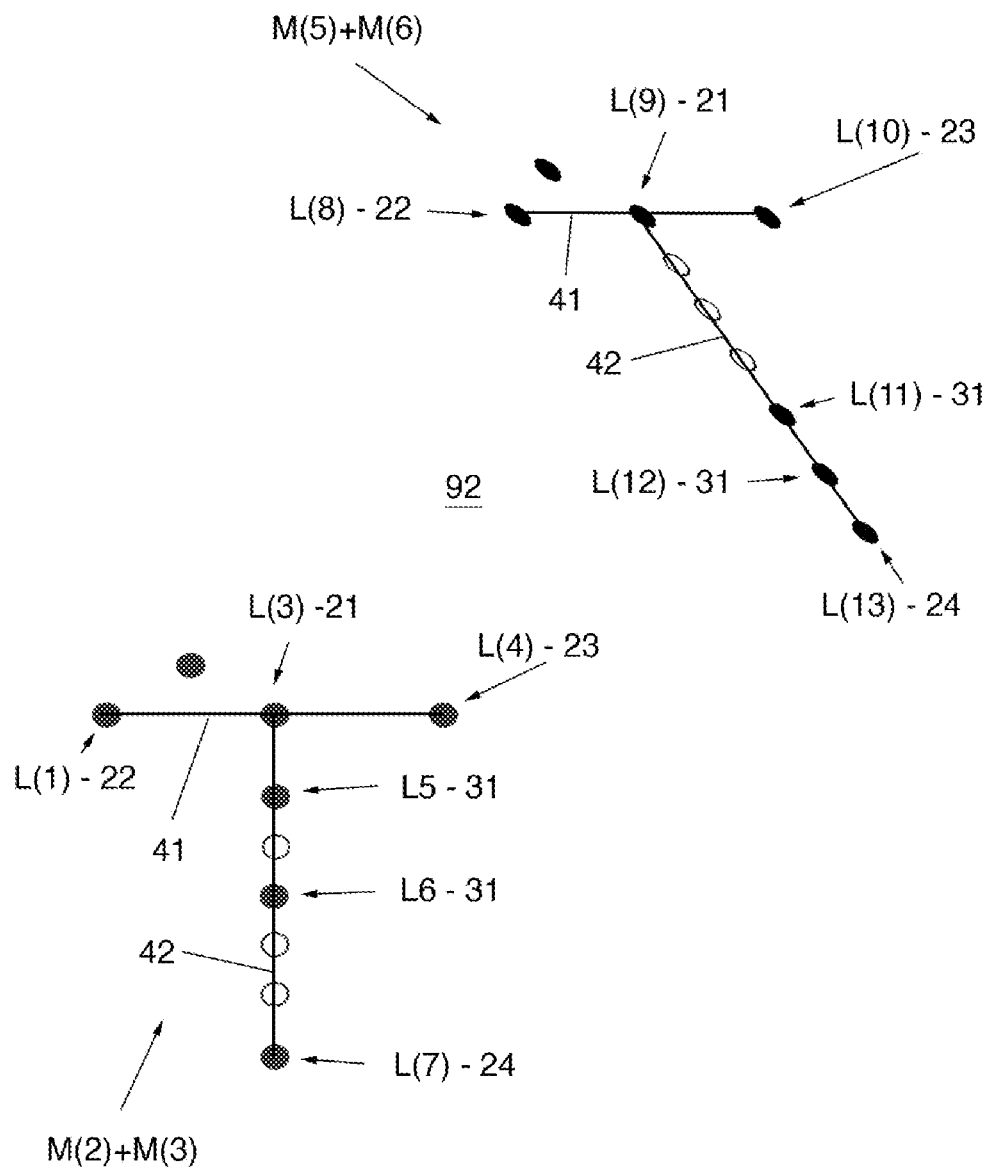

It is now clear that for the remaining possible marking units M(2), M(3), M(5), M(6) have only paths which have edge markings 20 at their ends as light points L(n). These can now be assigned to the respective markings 21, 22, 23, 24 for each possible marking unit. This is shown in FIG. 3d, in which for the possible marking units M(2)+M(3) and the possible marking units M(5)+M(6) the respective assignments of light points L(n) and markings 21, 22, 23, 24 are shown.

The procedure is basically that the edge markings 22, 23 of the straight path 41, where the common marking 21 is located in the middle of the straight path 41, are assigned to the first straight line 43 as the first outer marking 22 and second outer marking 23. The edge markings 21, 24 of the straight path 42, where the common marking 21 is at the end of the straight path 42, are assigned to the second straight line 44, where the common marking 21 is selected as the first end marking 21 and the other edge marking is selected as the second end marking 24. The respective remaining light points on each of the second paths 42 are communication elements 31.

Figure 3E:
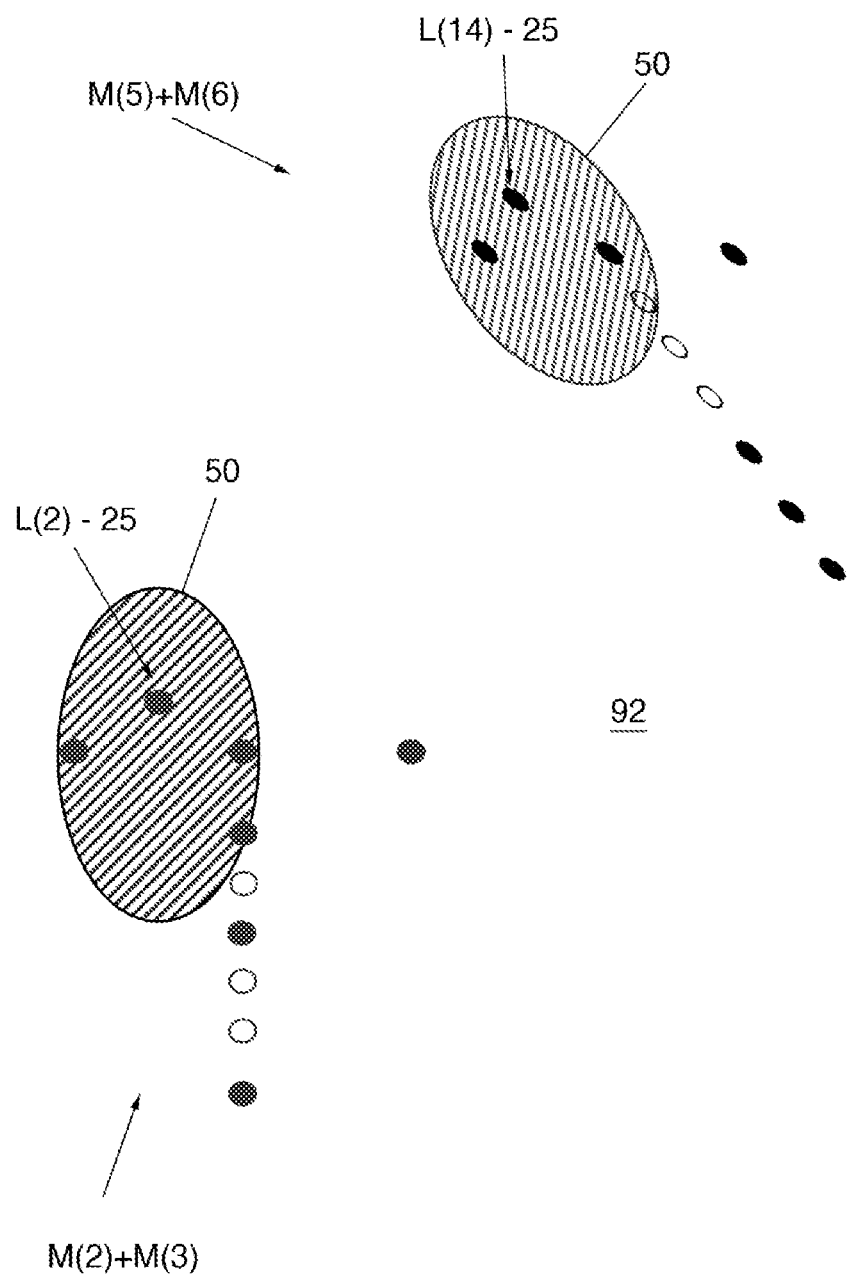

If, as already described, circles with appropriately selected radii are placed around the first outer marking 22 and the common marking 21 in a suitable manner, the intersection of the circles in each case results in an image area 50 as sketched in FIG. 3e. Light points lying in this image area 50, which are not yet assigned to any marking 21, 22, 23, 24 or to any communication element 31, are assigned in a subsequent evaluation step to the distinguished marking 25 for the respective possible marking units M(2)+M(3) and M(5)+M(6). In the example shown, these are the light points L(2) and L(14) respectively for the distinguished markings 25.

Subsequently, with algorithms known per se in knowledge of the markings 21, 22, 23, 24, 25, for each of the possible marking unit M(2)+M(3) as first marking unit 10 and the possible marking unit M(5)+M(6) as second marking unit 11, the orientation and position detection is carried out. Concrete possibilities for this have already been described in the introduction to the description and are not repeated here. The use of suitable P3P or AP3P methods, for example, possibly with subsequent numerical optimization, is sufficiently known to the skilled person from the prior art.

If orientation and position detection fails, no solution is generated.

An identification of the marking units 10, 11 in the image 92 is possible on the basis of the detected communication elements 31 on the second path 42. For this purpose, in a possible embodiment, the distance of the communication elements 31 can be normalized to the total length between the first end marking 21 and the second end marking 22 and compared with the known codes stored in the evaluation unit 91 for all marking units 10, 11 integrated in the system, in a corresponding normalization, so that the positions of the detected communication elements 31 can be compared with the expected positions of all codes stored in the evaluation unit 91.

A numerical method suitable for this and known to the skilled person in the application is the determination of the square deviations between a detected and all possible expected codes. The expected coding with the smallest square deviation then results in the coding and allows the marking unit 10, 11 to be identified. If a confidence level is not achieved with such an identification, which does not require orientation and position detection to be carried out, identification can also be carried out after orientation and position detection has been carried out, which allows possible distortions to be calculated out of the detected arrangement of the communication elements 31. However, this is not necessary in the majority of use cases.

Figure 4A:
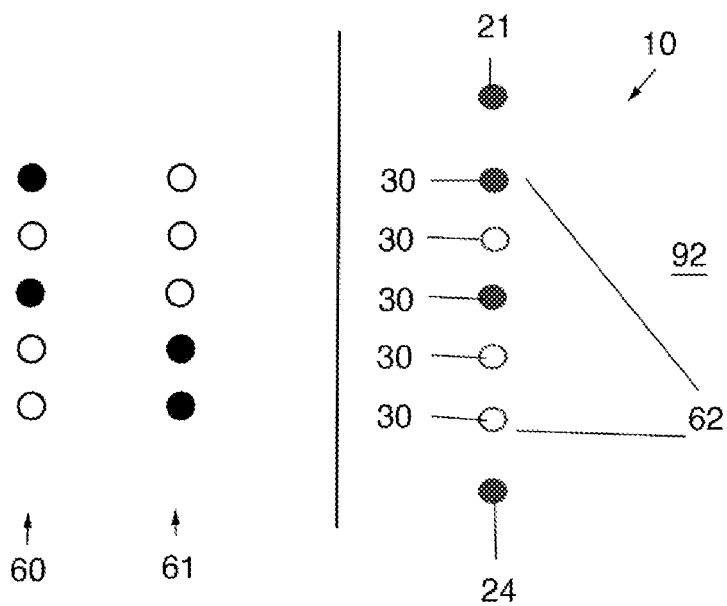
FIGS. 4a and 4b are schematic diagrams for identifying the marking unit based on captured communication elements.
Figure 4B:
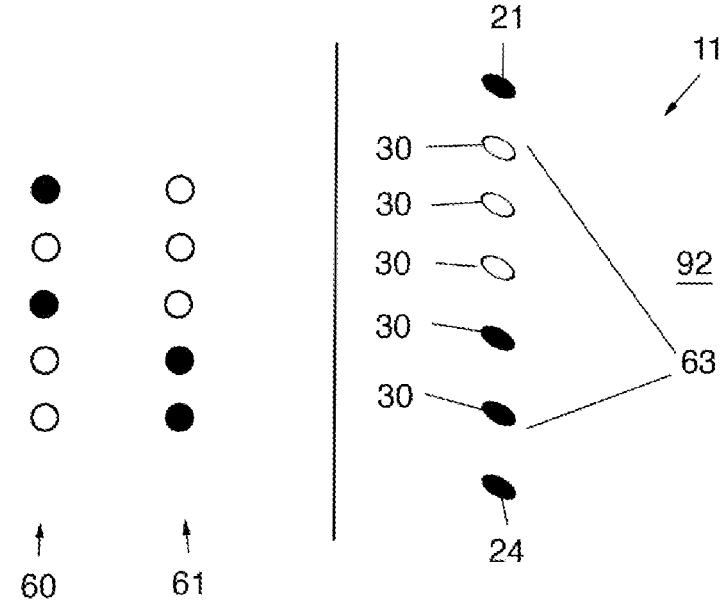

The procedure without performing orientation detection is graphically illustrated in FIGS. 4a, 4b for the receptacle 100 of the marking unit 10 and for the receptacle 110 of the marking unit 11 according to the images 92 shown in FIGS. 3a to 3e. It is assumed that only the two codes 60, 61 for marking units 10, 11 are provided in the system. These are shown in FIG. 4 in the same normalization as the codes 62, 63 recognized for the marking units 10, 11 from the images. In the case of the recognized codes 62, 63, the first and second end markings 21, 24 used for normalization are also shown, but these are not part of the recognized codes 62, 63 and are not taken into account in the comparison with the expected codes 60, 61, FIG. 4a shows the expected coding 60, 61, in which the individual elements of the coding 60, 61 are positioned equidistantly according to the real arrangement. In a vertical top view of the marking unit, exactly this arrangement would also be expected in the image 92 of the marking unit 10. In an oblique view, there is a distortion resulting in different distances between the communication element devices 30. In FIG. 4a, the distortion is small. The distances between the communication element devices 30 are hardly different. There is a clear assignment of the coding 62 recognized in the image 92 to the expected coding 60.

FIG. 4b shows the expected encodings 60, 61 in the same way. Due to the clear oblique view, there is a significant distortion in FIG. 4b. The distances between the communication element devices 30 are different and become smaller and smaller from the bottom to the top in the representation of the coding detected coding 63. However, there is still a clear mapping of the encoding 63 detected in the image 92 to the expected encoding 61 because the deviations from the expected encoding 60 are even larger. Despite the distortion, it is therefore possible to identify the marking unit 11 without performing an orientation or position detection.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 device
10 marking unit
11 marking unit
20 markings, comprising:
21 common marking (also referred to as the middle marking of the first path or the first end marking of the second path, depending on which path 41, 42 it belongs to).
22 first outer marking
23 second outer marking
24 second end marking
25 distinguished marking
26 dome
27 first distance
28 second distance
30 communication element means, when switched on also communication element
31 communication element
33 plane
41 first path
42 second path
43 first straight line
44 second straight line
50 image area
60 expected encoding of the marking unit 10
61 expected encoding of the marking unit 11
62 recognized encoding of the marking unit 10
63 recognized encoding of the marking unit 11
90 image capture unit designed as a digital camera
91 evaluation unit
92 image of the marking unit
100 image of the marking unit 10
110 image of the marking unit 11

The invention claimed is:

1. A device for orientation and position detection of markings in three-dimensional space, the device comprising:
at least one marking unit with several markings;
an optical image capture unit adapted to capture images of the marking unit; and
an evaluation unit adapted to unambiguously determine the orientation and the position of the marking unit,
wherein the marking unit has at least five markings for determining orientation and position, and
wherein:
exactly three markings are arranged on a first straight line and exactly two markings are arranged on a second straight line, wherein the first and second straight lines intersect in one of the markings so that exactly one common marking belongs to both the first and the second straight line,
the marking unit has at least one communication element for coding the marking unit,
the image capture unit is adapted to capture an image of the marking unit with the markings and the at least one communication element, wherein the markings and the at least one communication element are each optically active means,
the evaluation unit is adapted to determine the orientation and position of the marking unit in the captured image from the markings and to determine an identity of the marking unit from the at least one communication element,
the at least one communication element is arranged on the second straight line between the markings,
none of the communication elements are taken into account for the determination of orientation and position,
several marking units are provided, which are operable simultaneously in the device and which are adapted such that the marking units are distinguishable on the basis of the various communication elements, and
the evaluation unit is adapted to recognize all markings and/or communication elements in the captured image and to assign 2-dimensional image coordinates to the markings and/or communication elements in the captured image.

2. The device according to claim 1, wherein a first straight path connecting the markings on the first straight line and a second straight path connecting the markings on the second straight line form a T-shape, wherein the first straight path is shorter than the second straight path and the straight second path preferably meets the first straight path exactly in the middle.

3. The device according to claim 1, wherein at least one distinguished marking neither lies directly on one of the first and second straight lines nor is arranged outside a plane spanned by the first and second straight lines in such a way that a perpendicular projection of the at least one distinguished marking into the plane lies on one of the straight lines.

4. The device according to claim 3, wherein the at least one distinguished marking is arranged above the plane spanned by the first and second straight lines.

5. The device according to claim 3, wherein the at least one distinguished marking and/or the projection of the at least one distinguished marking into the plane is arranged at a first distance from a middle marking of the first straight line and at a second distance from a first of outer markings of the first straight line, wherein the first distance and the second distance are each smaller than a distance between the first outer marking and the middle marking along the first straight line.

6. The device according to claim 5, wherein the first distance and the second distance are equal.

7. The device according to claim 1, wherein between one to three communication elements are provided between the two markings of the second straight line.

8. The device according to claim 1, wherein the evaluation unit is further adapted to determine in the captured image all straight paths with a total of exactly three markings and/or communication elements.

9. The device according to claim 8, wherein the evaluation unit is further adapted to determine from all determined straight paths with exactly three markings and/or communication elements the straight paths which have exactly one common marking, the straight paths which have exactly one common marking being assigned to a possible marking unit if it is determined that for exactly one straight path the common marking is located in the middle of the straight path and for at least one other straight path the common marking is located at one end of the straight path.

10. The device according to claim 8, wherein the evaluation unit is further adapted to determine, in particular in the case of the straight paths associated with a possible marking unit, a subgroup of straight paths having matching edge markings at their two ends.

11. The device according to claim 8, wherein the evaluation unit is further adapted to assign edge markings of two of the determined straight paths, respectively, as provisional markings of a marking unit.

12. The device according to claim 11, wherein the evaluation unit is further adapted to assign the edge markings of a first straight path to the first straight line as a first outer marking and a second outer marking, where the common marking lies in the middle of the first straight path, and to assign the edge markings of a second straight path, in which the common marking lies at the end of the second straight path, to the second straight line, wherein the common marking is selectable as a first end marking and the other edge marking is selectable as a second end marking.

13. The device according to claim 12, wherein the evaluation unit is further adapted to define an image area in the captured image and to check whether a further marking with 2-dimensional image coordinates is arranged in the image area in the captured image.

14. The device according to claim 11, wherein the evaluation unit is further adapted to perform a first preliminary orientation and position detection with four of the at least five markings and to determine expected image coordinates for a fifth of the at least five markings in the captured image on the basis of the preliminarily determined orientation and position of the marking unit and to compare the expected image coordinates with actually assigned image coordinates.

15. The device according to claim 1, wherein the evaluation unit is further adapted to improve the orientation and position detection by means of numerical optimization.

16. The device according to claim 1, wherein the evaluation unit is further adapted to determine the identity of the marking unit from the distance between the communication element and one of the two markings, the distance being normalized to the distance between the two markings on the second straight line.

17. A tangible, non-transitory computer-readable medium containing program code, which upon being executed by a processor of an evaluation unit that is disposed in a device for orientation and position detection of markings in three-dimensional space, adapts the evaluation unit to:
  determine an orientation and position of a marking unit of the device, in a captured image of the marking unit, wherein the marking unit has at least five markings and the orientation and position is determined from the markings, wherein exactly three markings are arranged on a first straight line and exactly two markings are arranged on a second straight line, wherein the first and second straight lines intersect in one of the markings so that exactly one common marking belongs to both the first and the second straight line, and wherein at least one communication element is arranged on the second straight line between the markings;
  determine an identity of the marking unit from the at least one communication element;
  recognize all markings and/or communication elements in the captured image and assign 2-dimensional image coordinates to the markings and/or communication elements in the captured image; and
  determine, in the captured image, all straight paths with a total of exactly three markings and/or communication elements,
  wherein none of the communication elements are taken into account for the determination of orientation and position.

* * * * *